UNITED STATES PATENT OFFICE 2,303,605

ROCHELLE SALT PRODUCTION

Geza Braun, New York, N. Y., assignor to Standard Brands Incorporated, New York, N. Y., a corporation of Delaware No Drawing. Application August 3, 1940, Serial No. 351,162

7 Claims. (Cl. 260—536)

The invention relates to a process for the production of Rochelle salt. More particularly, it pertains to the manufacture of Rochelle salt from materials containing potassium acid tartrate, and includes correlated improvements and discoveries whereby such manufacture may be carried out effectively.

Rochelle salt has been prepared by neutralizing materials containing potassium hydrogen tartrate, as cream of tartar, with the hydroxide or carbonate of sodium. The procedure usually has been to treat the potassium hydrogen tartrate material with sodium carbonate in excess at a high temperature. The solution so obtained was filtered hot, and the filtrate concentrated to the desired extent, whereupon Rochelle salt was obtained through cooling. A mother liquor resulted which was further evaporated to effect crystallization of additional amounts of Rochelle salt, and this procedure can be repeated. While Rochelle salt was prepared in this manner, nevertheless the procedure was attended by certain objectionable features, such as, for example, that the weak liquors foam excessively during distillation, which causes considerable losses, and the numerous evaporations and granulations render the process rather costly. An object of the present invention is to provide a process whereby these disadvantages are in a large measure obviated.

A further object of the invention is to provide a process whereby Rochelle salt may be obtained from potassium hydrogen tartrate materials with comparative simplicity and ease of accomplishment.

An additional object of the invention is a provision of a manner of operation which leads to the production of Rochelle salt directly without necessity for evaporation.

A more specific object of the invention is to manufacture Rochelle salt by a procedure in which a potassium hydrogen tartrate material is neutralized in a relatively highly concentrated solution of Rochelle salt, and subsequently treated with carbonate of sodium and potassium.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

Manufacture of Rochelle salt entails ordinarily the use of two starting materials, both of which contain potassium hydrogen tartrate. The one is a crude cream of tartar which may be obtained from mother liquors which are no longer useable in processes for the obtention of tartaric acid, and the other is the naturally obtained product argols. In the event that a crude cream of tartar is employed containing 96% potassium acid tartrate, the production of Rochelle salt therefrom may be effected by neutralizing with a suitable alkali, as sodium hydroxide in a highly concentrated Rochelle salt solution, preferably a saturated solution, at an elevated temperature. This temperature may be in the neighborhood of the boiling point, and satisfactory results have been obtained at about 190° F. In place of sodium hydroxide the corresponding carbonate might be used, but there results a decided foaming of the viscous solution.

When argols are used as the potassium hydrogen tartrate material it should be treated to effect change in the wine yeast content so that the solutions may be more readily filtered. It may be mentioned that argols contain a considerable amount of calcium tartrate and other extraneous material, as wine yeast, sand, etc., and because of this the initial treatment may be a roasting if dry, and an autoclaving if moist. Following this the argols may be suspended in a saturated Rochelle salt solution, and then neutralized with sodium hydroxide at an elevated temperature, and calcium tartrate converted by means of sodium potassium carbonate.

Hence, in the practice of the invention a potassium hydrogen tartrate material, as cream of tartar or argols, may be suspended in a hot concentrated solution of Rochelle salt, e. g. a saturated solution, either prepared especially or resulting from a previous treatment, and the solution neutralized and heated with an excess of sodium and potassium carbonates. The reaction mass may now have solids separated from liquid, as by filtering, and the filtrate or solution deposits the Rochelle salt when cooled. The Rochelle salt obtained is in an amount which shows conversion of substantially all of the tartarous materials. Removal of crystallized Rochelle salt from the solution may be carried out in a suitable manner, and the separated mother liquor repeatedly utilized in the process as the medium in which further amounts of potassium hydrogen tartrate containing material are processed.

Neutralization may be accomplished, preferably by means of sodium hydroxide, and it is desirable to have a filter aid present in the solution in order to facilitate filtration and subsequent washing of the cake. A satisfactory mode of neutralizing with sodium hydroxide and which is attended by certain economies is to form the sodium hydroxide in situ by reaction between sodium carbonate and lime. Such procedure is more economical than introduction of pure sodium hydroxide, and the calcium carbonate precipitated within the solution serves as a filter aid.

As an illustrative embodiment of a manner in which the invention may be practiced, the following procedures are given:

I. Manufacture from cream of tartar

Into a reaction vessel provided with means for heating and for stirring there may be introduced about 1500 gallons of a concentrated Rochelle salt solution. This solution may be prepared by dissolving Rochelle salt in water, or it may be a solution arising from a previous operation. Into this solution there is then introduced about 5200 lbs. of dry 96% crude cream of tartar, and the mixture neutralized with a sodium hydroxide solution of about 50% strength to a pH value of about 8. Thereafter there may be added 50 lbs. of potassium carbonate, and the reaction mass heated to a temperature of about 160° F., for a period of about 15 minutes. A filter aid in an amount of about 200 lbs. may then be incorporated and the mass passed into a filter press for separation of solid and liquid. The cake obtained by filter pressing may be washed in the first instance with a weak Rochelle salt solution, and finally with water, using a countercurrent procedure, and continuing until the cake is substantially free from Rochelle salt. The strong solution of Rochelle salt coming from the filter press may then be granulated or crystallized, as in a vacuum pan provided with a stirrer, and the crystalline Rochelle salt subsequently removed, as by means of a centrifuge.

By this procedure Rochelle salt in excellent yield is obtained, and the mother liquor may be utilized for the treatment of a succeeding quantity of material. I have found that the liquor may be repeatedly used up to 10 to 20 times without disadvantage. When the impurities have accumulated to such an extent as to make further use impractical, it may then be employed for recovery of the tartarous material in the form of a cream of tartar, as for example, by the procedure described in my copending application Serial No. 351,161, filed August 3, 1940. Further, a 10% portion of the mother liquor may be removed following each separation of Rochelle salt, and in this manner the purity thereof may be maintained at a relatively constant level, and thereby there results, as it were, a continuous use of mother liquor as the reaction medium.

In the event that cream of tartar is introduced in a wet condition, i. e., containing about 10 to 30% of water, the reaction mixture will then be diluted to that extent, and there will result an excess of mother liquor. However, this may be concentrated by evaporation and added to the charge before treatment so that a desired concentration for granulation will attain.

II. Manufacture from argols

Into a reaction vessel provided with means for heating and for stirring there may be placed about 1500 gallons of a saturated Rochelle salt solution, together with 1300–1500 lbs. sodium carbonate and 50–100 lbs. of potassium carbonate. These materials are added with constant stirring. Heating of the reaction mass nearly to the boiling point, as 190° F. is then effected, and into it there is introduced while still hot a suspension of calcium hydroxide prepared by slaking 450 lbs. of calcium oxide with 400 gallons of a 20° to 25° Bé. Rochelle salt solution which may be a press liquor. Immediately about 3600 lbs. of roasted argols—containing about 2500 lbs. of tartaric acid—are added as quickly as possible and with constant stirring. When the argols has dissolved the reaction mix may be heated to 210° F. for a period which may be in the neighborhood of one-half hour, or until a hot filtered sample remains clear when boiled with an excess of sodium carbonate. This indicates the absence of calcium tartrate and completion of the reaction.

Solid and liquid in the reaction mixture are now separated by introduction into a filter press, and the cake obtained may be washed free from Rochelle salt first with weak wash liquors and then with hot water, utilizing countercurrent procedure. The filtrate or strong liquor coming from the filter press is then granulated, and a good yield of Rochelle salt is obtained. Mother liquor coming from the Rochelle salt separation may be employed as the medium for a succeeding processing, and the first wash liquor having a Rochelle salt content giving from about 25 to about 30° Bé. may be used for slaking lime, and the weak wash liquors may be employed in the initial washing of a succeeding press cake. The liquors from which the crystalline Rochelle salt separates are supersaturated, and preferably are from 37° to 42° Bé. When such solutions are cooled Rochelle salt separates therefrom readily. However, saturated solutions of from 30° to 37° Bé. may also be obtained if desired. I have found that the mother liquors may be returned to the process at least thirty times, when there is no removal, and, as indicated above when a 10% removal is effected, the liquors may be employed continuously.

It is desirable that the argols utilized be of a high purity, i. e. having a low percentage of lees and of calcium tartrate. Especially, the presence of lees is to be obviated inasmuch as the filtration of hot concentrated Rochelle salt solutions obtained from such an argols is difficult and decidedly slow. Whether the Rochelle salt be obtained from cream of tartar or from argols, it is a highly pure product but slightly colored.

Further, the total heavy metal content is less than one part per million. If a purer product is sought it may be secured by dissolving the slightly colored salt in a small quantity of water, or in a mother liquor from a previous processing. The temperature may be about 160° F., and the solution treated with about ½ of 1% of an active decolorizing carbon. The solution is filtered to remove carbon and adsorbed impurities, whereupon the supersaturated solution is cooled with crystallization and deposition of Rochelle salt which may be separated by centrifuging.

The Rochelle salt obtained contains about 2% moisture and is free from iron and heavy metals. This is a reagent quality compound and consists of well defined medium sized brilliant crystals which retain their brilliancy when dried in air. For drying, the wet crystals may be introduced into a rotary drier and treated at a temperature not exceeding 110° F., with air conditioned to about 15% relative humidity. These conditions permit the drying of the Rochelle salt without loss in water of crystallization. The pH value of the cooked charge should be about 8.5 to 9.5, and values of approximately 9 are preferred.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the production of Rochelle salt which comprises neutralizing a potassium hydrogen tartrate containing material initially in a concentrated solution of Rochelle salt, treating with an alkali metal carbonate with formation of Rochelle salt and then separating Rochelle salt so produced.

2. A process for the production of Rochelle salt which comprises neutralizing a potassium hydrogen tartrate containing material initially in a saturated solution of Rochelle salt, treating with an alkali metal carbonate at an elevated temperature with formation of Rochelle salt and then separating Rochelle salt so produced.

3. A process for the production of Rochelle salt which comprises neutralizing a potassium hydrogen tartrate containing material initially in a saturated solution of Rochelle salt, treating with an alkali metal carbonate at a temperature of 160–190° F. with formation of Rochelle salt and then separating Rochelle salt so produced.

4. A process for the production of Rochelle salt which comprises neutralizing a potassium hydrogen tartrate containing material with sodium hydroxide initially in a concentrated solution of Rochelle salt, treating with an alkali metal carbonate at an elevated temperature with formation of Rochelle salt, filtering to remove insoluble substances, cooling whereupon Rochelle salt crystallizes, and then separating Rochelle salt so produced.

5. A process for the production of Rochelle salt which comprises neutralizing a potassium hydrogen tartrate solution with sodium hydroxide to a pH value of about 8 initially in a saturated solution of Rochelle salt, treating with an alkali metal carbonate at a temperature of 160 to 190° F. with formation of Rochelle salt, filtering to remove insoluble substances, cooling whereupon Rochelle salt crystallizes, and then separating Rochelle salt so produced.

6. A process for the production of Rochelle salt which comprises initially dissolving sodium carbonate in a concentrated solution of Rochelle salt, forming sodium hydroxide therein through the addition of calcium hydroxide, adding argols thereto, heating to about 210° F., treating with an alkali metal carbonate with formation of Rochelle salt, filtering, subsequently crystallizing Rochelle salt from the solution so obtained, and then separating Rochelle salt therefrom.

7. A process for the production of Rochelle salt which comprises neutralizing a potassium hydrogen tartrate material with sodium hydroxide of about 50% concentration at a temperature of about 160° F. initially in a saturated solution of Rochelle salt, treating with an alkali metal carbonate at a temperature of 160 to 190° F. with formation of Rochelle salt, filtering to remove insoluble matter, cooling whereupon crystallization of Rochelle salt ensues, separating the crystallized salt, dissolving, and clarifying by treatment with a decolorizing carbon.

GEZA BRAUN.